(12) United States Patent
Lutz

(10) Patent No.: US 10,953,936 B2
(45) Date of Patent: Mar. 23, 2021

(54) DOUBLE STRETCH TRAILER

(71) Applicant: David W. Lutz, Carlisle, PA (US)

(72) Inventor: David W. Lutz, Carlisle, PA (US)

( * ) Notice: Subject to any disclaimer, the term of this patent is extended or adjusted under 35 U.S.C. 154(b) by 84 days.

(21) Appl. No.: 15/830,950

(22) Filed: Dec. 4, 2017

(65) Prior Publication Data
US 2018/0162463 A1 Jun. 14, 2018

Related U.S. Application Data

(60) Provisional application No. 62/432,089, filed on Dec. 9, 2016.

(51) Int. Cl.
| | |
|---|---|
| *B62D 53/06* | (2006.01) |
| *B62D 13/02* | (2006.01) |
| *B62D 33/02* | (2006.01) |
| *B62D 33/08* | (2006.01) |
| *B62D 21/14* | (2006.01) |
| *B62D 63/06* | (2006.01) |

(52) U.S. Cl.
CPC ......... *B62D 53/067* (2013.01); *B62D 13/025* (2013.01); *B62D 21/14* (2013.01); *B62D 33/02* (2013.01); *B62D 33/08* (2013.01); *B62D 53/061* (2013.01); *B62D 63/061* (2013.01); *B62D 63/068* (2013.01)

(58) Field of Classification Search
CPC ...... B62D 13/025; B62D 33/02; B62D 33/08; B62D 53/061; B62D 53/067; B62D 21/14; B62D 63/061; B62D 63/068
USPC ....................................................... 280/400
See application file for complete search history.

(56) References Cited

U.S. PATENT DOCUMENTS

| | | | | |
|---|---|---|---|---|
| 3,533,644 A | * | 10/1970 | Humes | B62D 13/025 280/426 |
| 3,557,980 A | | 1/1971 | Klaus | |
| 4,033,625 A | * | 7/1977 | Fikse | B60P 1/18 298/22 R |
| 6,343,825 B1 | * | 2/2002 | Gee | B62D 53/062 280/789 |
| 2007/0140804 A1 | * | 6/2007 | Abel | B60P 3/40 410/44 |
| 2009/0160216 A1 | * | 6/2009 | Gosselin | B62D 21/14 296/184.1 |
| 2011/0266774 A1 | * | 11/2011 | Gregg | B62D 13/00 280/419 |
| 2015/0084314 A1 | * | 3/2015 | Ingels | B62D 21/14 280/656 |

(Continued)

FOREIGN PATENT DOCUMENTS

| | | |
|---|---|---|
| CA | 2714923 A1 | 11/2011 |
| DE | 1988891 U | 7/1968 |

(Continued)

*Primary Examiner* — Kevin Hurley
*Assistant Examiner* — Felicia L. Brittman
(74) *Attorney, Agent, or Firm* — The Webb Law Firm

(57) ABSTRACT

Disclosed is a trailer including a bed portion. The bed portion includes a deck, a front extension, and a rear extension. The deck has a first end and a second end. The front extension is slideably engaged with the first end of the deck, and the rear extension is slideably engaged with the second end of the deck. The trailer is a "double stretch" trailer that is extendable from both ends of the deck. A towing system including a cab and the trailer is also disclosed.

20 Claims, 18 Drawing Sheets

(56) References Cited

U.S. PATENT DOCUMENTS

2018/0170458 A1\* 6/2018 Morena ................ B62D 53/067

FOREIGN PATENT DOCUMENTS

| EP | 0094701 | A1 | * | 11/1983 | ............ B60P 1/6481 |
|----|---------|----|---|---------|--------------------------|
| EP | 0094701 | A1 |   | 11/1983 |                          |
| EP | 0414254 | A2 |   | 2/1991  |                          |
| EP | 1122151 | A1 | * | 8/2001  | ............... B60G 3/01 |
| EP | 1122151 | A1 |   | 8/2001  |                          |

\* cited by examiner

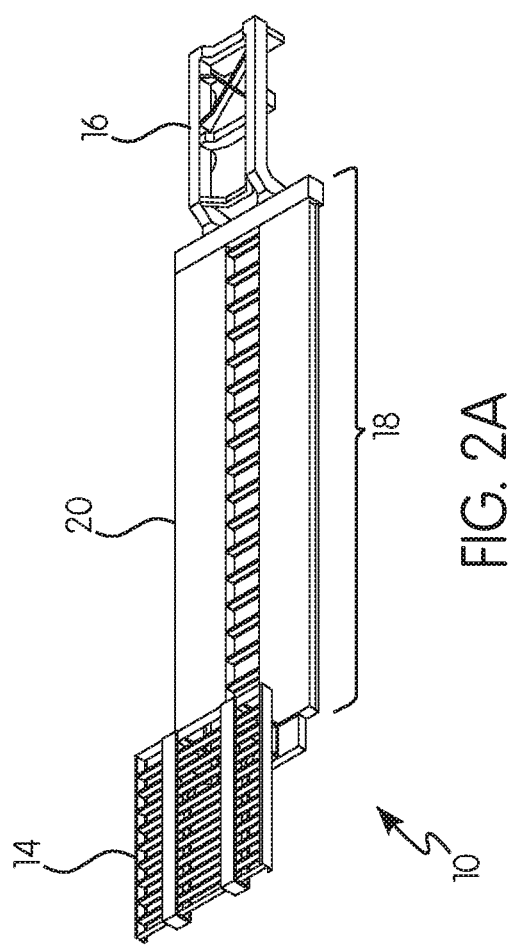
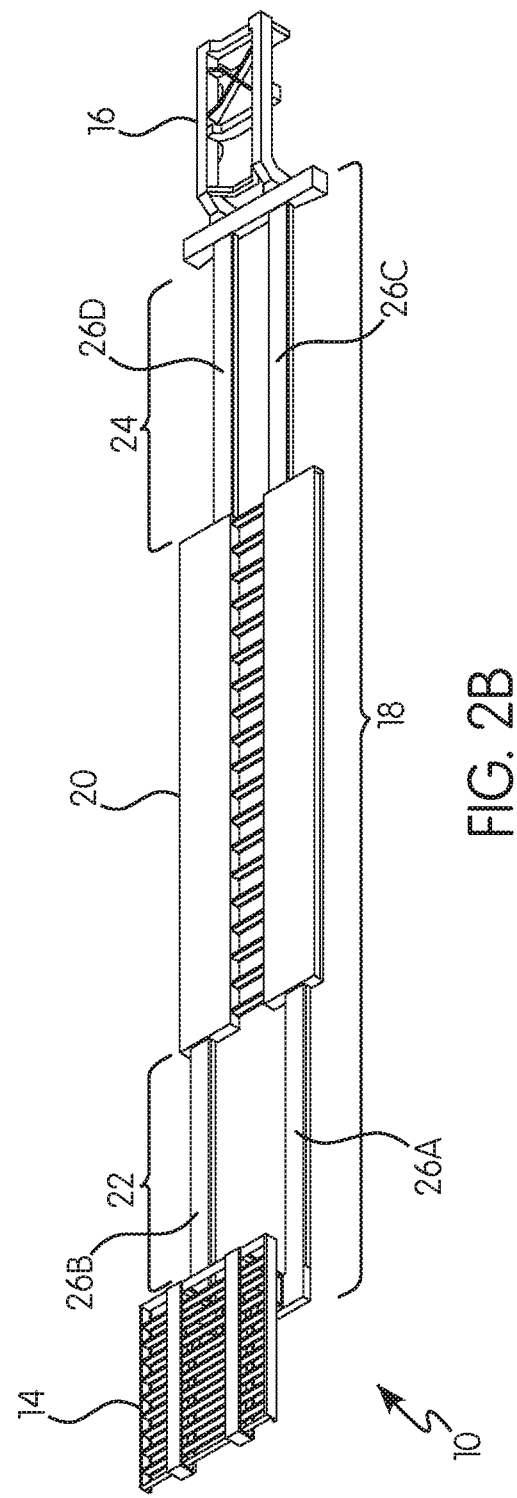

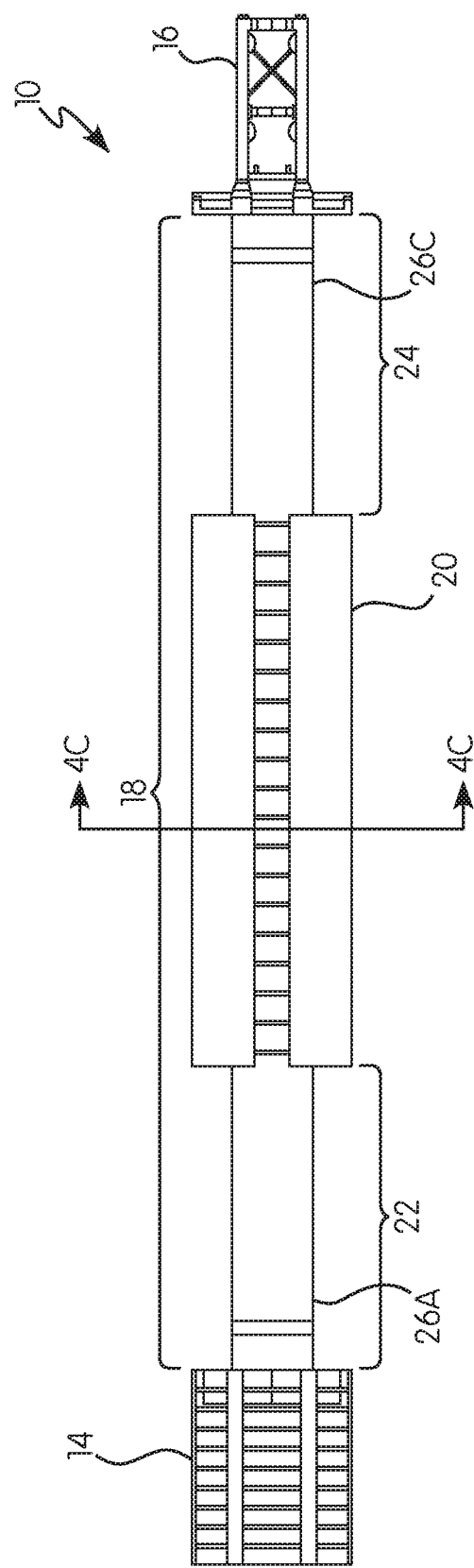

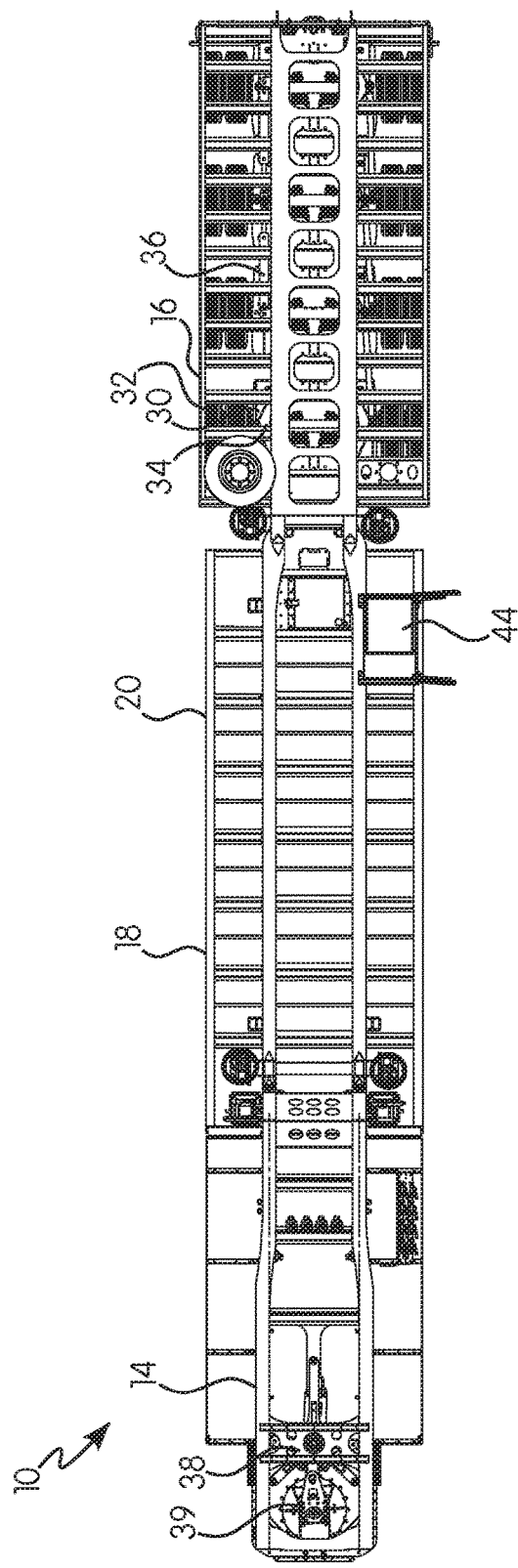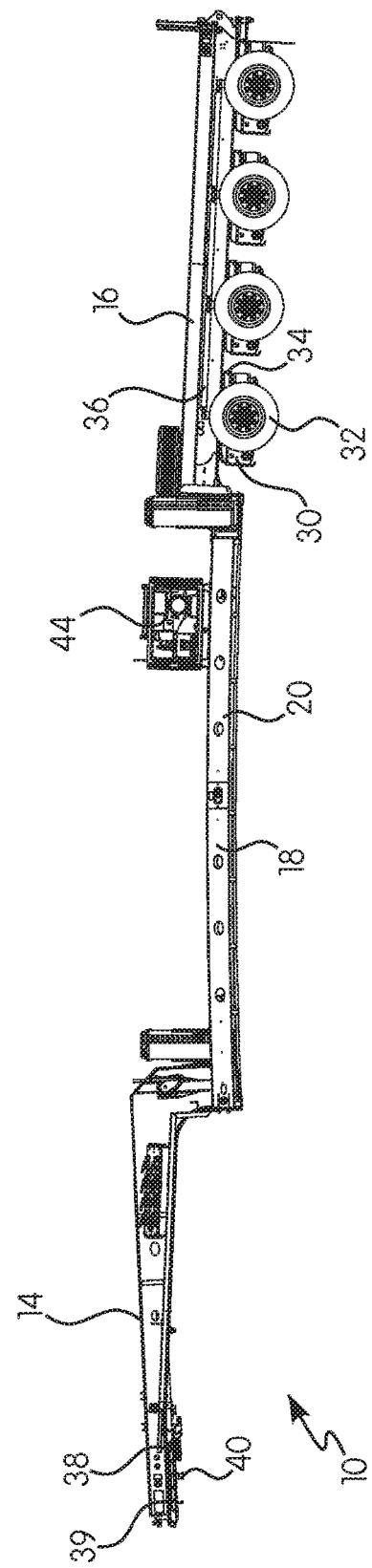
FIG. 7A
FIG. 7B

DOUBLE STRETCH TRAILER

CROSS REFERENCE TO RELATED APPLICATIONS

This application claims priority to U.S. Provisional Patent Application No. 62/432,089, filed Dec. 9, 2016, the disclosure of which is hereby incorporated in its entirety by reference.

BACKGROUND OF THE INVENTION

Field of the Invention

The present invention relates to a trailer including a bed portion, the trailer being stretchable, e.g., extendable, in two directions.

Description of Related Art

Trailers, such as lowboy trailers, are attachable to cabs to haul loads of various shapes and sizes. At times, the load to be carried is quite long, and, thus, requires a trailer of significant length to haul the load. Stretch trailers can be used, which include a portion that stretches (is slideably engaged) from a main deck of the trailer bed to adjust to a sufficient length. After the load is carried to the destination, the length of the trailer can be slid back to its original length so special permits only need to be obtained for the portion of the trip in which the trailer is driven at an extend length.

Commercially available stretch trailers include only a single slideable portion or multiple telescoping portions that slide out from the main deck in a single direction such that the main deck, which is the strongest part of the trailer, is in either the front or the back of the stretched trailer (the single or multiple portions extend to either the front or rear direction). However, the portion of the trailer that often requires the most strength to carry the load is the middle span section of the trailer. Thus, there is a need in the art for a trailer that allows for the main deck of the trailer to be in the middle section of the trailer to optimally support the load.

Further, commercially available trailers that include only a single or multiple telescoping slideable portions that slide out from the main deck in a single direction are limited in their stretch length. Extensions are available to extend the length of the trailer, but these extensions are awkward to use and are pinned in place. Further, these extension cannot be inserted back into the main deck once the longer trailer is no longer needed. A need exists in the art for a trailer longer than the commercially available trailers including only a single slideable portion without the use of cumbersome extensions.

SUMMARY OF THE INVENTION

The present invention is directed to a trailer including a bed portion. The bed portion includes a deck, a front extension, and a rear extension. The deck includes a first and second end. The front extension is slideably engaged with the first end of the deck. The rear extension is slideably engaged with the second end of the deck.

The first end or the second end may include a plurality of slots. The front extension may include a plurality of beams slideably engaged with the plurality of slots in the first end of the deck. The rear extension may include a plurality of beams slideably engaged with the plurality of slots in the second end of the deck. In a first position, the front extension and the rear extension may extend from the deck only enough to attach an attachment portion and a rear portion, respectively, to the front extension and the rear extension. The first end may include a plurality of slots and the second end may include a single slot or the second end may include a plurality of slots and the first end may include a single slot. In a second position, the front extension or the rear extension may extend farther from the deck as compared to the first position. In the second position, the front extension or the rear extension may be configured to be pinned at a predetermined length. The trailer may include an attachment portion configured to attach the trailer to a cab. The trailer may be lockable such that, in a locked position, the front extension or rear extension is not slideable relative to the deck. The front extension may be slideable relative to the deck independent from the rear extension, and the rear extension may be slideable relative to the deck independent from the front extension. At least a portion of the bed portion may be made of steel. The bed portion may include an arc-shaped section. The bed portion may include a horizontal section. The trailer may include a plurality of axles and a bellcrank, and the bellcrank may co-act with the plurality of axles to turn the plurality of axles relative to the deck. Each of the plurality of axles may be attached to a turntable to effect turning of the plurality of axles. The bellcrank may be attached to a ring bearing and at least one cylinder, and rotation of the ring bearing may effect movement of the at least one cylinder, which is configured to co-act with the turntables to effect turning of the plurality of axles. Each of the turntables may be attached to an adjacent turntable by an attaching member, such that rotation of one turntable effects rotation of the adjacent turntable. The trailer may include a plurality of axles, and the trailer may further include at least one power unit configured to manually turn the plurality of axles.

The present invention is also directed to a towing system including a cab and a trailer. The trailer includes a bed portion. The bed portion includes a deck, a front extension, and a rear extension. The deck includes a first and second end. The front extension is slideably engaged with the first end of the deck. The rear extension is slideably engaged with the second end of the deck.

BRIEF DESCRIPTION OF THE DRAWINGS

FIG. 2A shows a perspective view of a trailer in a first position;

FIG. 2B shows a perspective view of a trailer in a second position;

FIG. 3C shows a top view of another embodiment of a trailer;

FIG. 7A shows a top view of a trailer having a steering mechanism;

FIG. 7B shows a side view of the trailer of FIG. 7A;

FIG. 7I shows a top view of the attachment portion of FIG. 7H with the ring bearing rotated;

DESCRIPTION OF THE INVENTION

For the purpose of the following detailed description, it is to be understood that the invention may assume various alternative variations and step sequences, except where expressly specified to the contrary. Moreover, other than in any operating examples, or where otherwise indicated, all numbers used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

Figure 1:
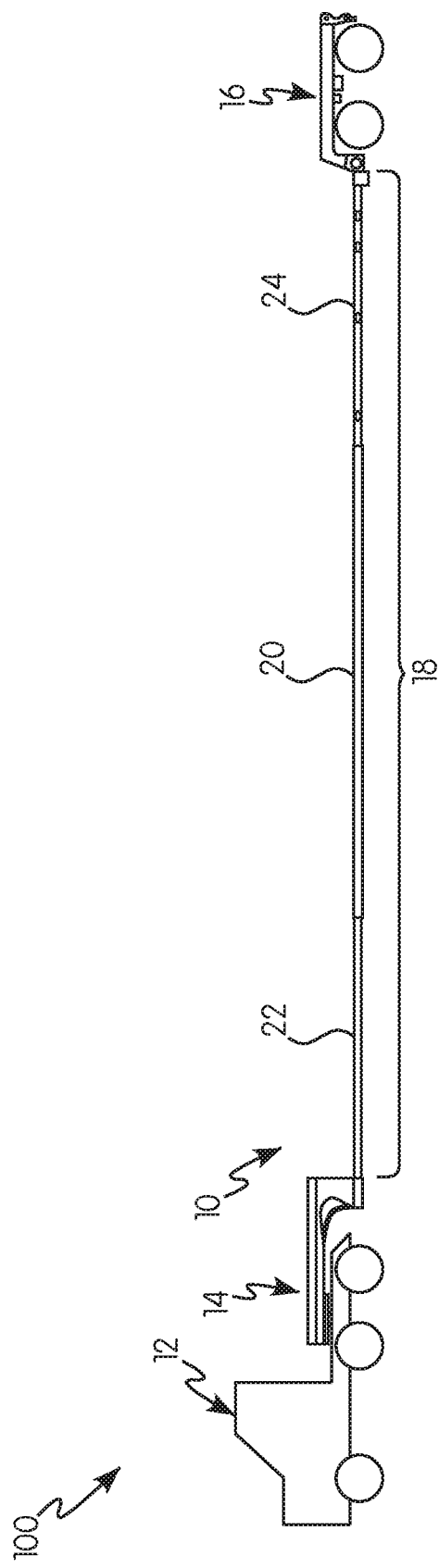
FIG. 1 shows a side view of a towing system with a trailer attached to a cab.

Referring to FIG. 1, a towing system 100 may have a trailer 10 attached to a cab 12 to haul loads of various shapes and sizes. The trailer 10 may be any type of trailer 10, such as a lowboy trailer 10 (see FIGS. 1-3B and 5), a flatbed trailer 10, or a step deck trailer 10. The cab 12 may be the cab 12 of a truck or other motorized vehicle with sufficient power to tow the trailer 10. The trailer 10 may include an attachment portion 14, a rear portion 16, and a bed portion 18 running between the attachment portion 14 and the rear portion 16. The attachment portion 14 may engage with the cab 12 (such as with the fifth wheel of the cab 12) to securely attach the trailer 10 to the cab 12. The attachment portion 14 may be fixed to or detachable from the bed portion 18. The trailer 10 may be attached to the cab 12 using any sufficient attaching configuration. The attachment portion 14 may be in communication with a first end of the bed portion 18, and the rear portion 16 may be in communication with a second end opposite the first end of the bed portion 18. The rear portion 16 may include wheels 32, and these wheels 32 may be steerable by a driver of the cab 12, when the trailer 10 is attached to the cab 12. The rear portion 16 may be fixed to or detachable from the bed portion 18.

With reference to FIGS. 1-5, the bed portion 18 may include a deck 20, a front extension 22, and a rear extension 24, the front extension 22 and the rear extension 24 slideably engaged with the deck 20. The deck 20 may have a larger thickness than the front extension 22 and rear extension 24 and may be able to support a higher stress (e.g., the deck 20 may be stronger than the front extension 22 and the rear extension 24). The front extension 22 may include a plurality of beams 26A, 26B, and the rear extension 24 may include a plurality of beams 26C, 26D, as shown in FIG. 3A. At least one of the front extension 22 or the rear extension 24 may include a plurality of beams 26A-26B, and the other of the front extension 22 and the rear extension 24 may include a single beam 26C, as shown in FIG. 3B. The single beam 26C may be the front extension 22 or the rear extension 24 and is not limited to the single beam 26C being the rear extension 24, as shown in FIG. 3B. Alternatively, both the front extension 22 and the rear extension 24 may each comprise a single beam 26A, 26C (see FIG. 3C). The deck 20 may include a first end toward the front of the trailer 10 and a second end opposite the first end and toward the rear of the trailer 10.

Figure 4A:
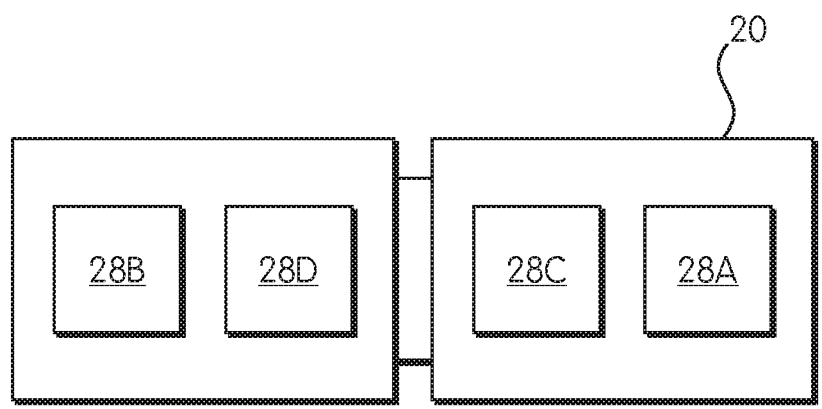
FIG. 4A shows a cross section along lines 4A-4A of FIG. 3A of a deck.

Referring to FIG. 4A, the first end may include a plurality of slots 28A, 28B, and the second end may include a plurality of slots 28C, 28D. The beams 26A, 26B of the front extension 22 may be slideably engaged with the plurality of slots 28A, 28B of the first end. The beams 26C, 26D of the rear extension 24 may be slideably engaged with the plurality of slots 28C, 28D of the second end.

Figure 4B:
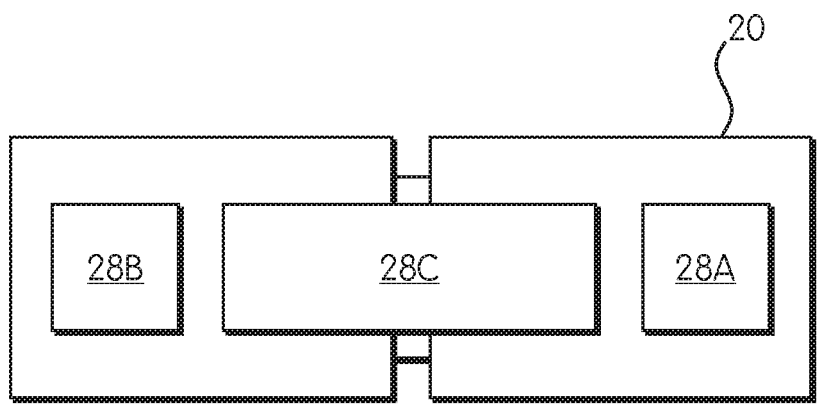
FIG. 4B shows a cross section along lines 4B-4B of FIG. 3B of a deck.

Referring to FIG. 4B, the first end may include a plurality of slots 28A, 28B and the second end may include a single slot 28C. The beams 26A, 26B of the front extension 22 may be slideably engaged with the plurality of slots 28A, 28B of the first end. The single beam 26C of the rear extension 24 may be slideably engaged with the single slot 28C of the second end. The configuration in FIG. 4B may be switched where the front extension 22 has a single of beam and slot while the rear extension 24 includes a plurality of beams and slots. Alternatively, the front extension 22 may include a single of beam and slot and the rear extension 24 may include a single beam and slot.

Figure 4C:
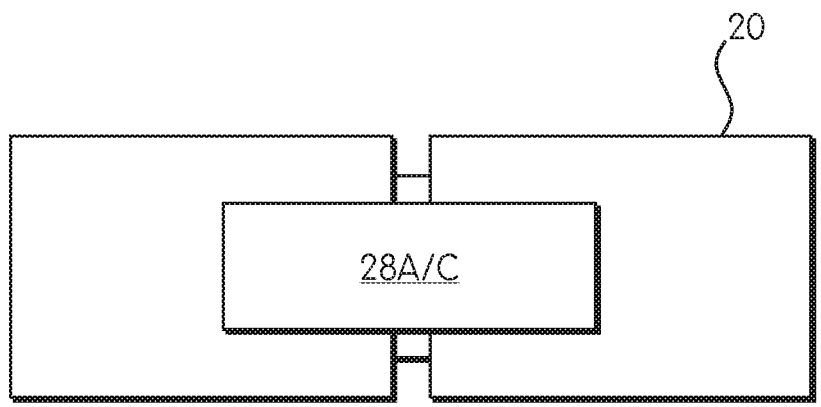
FIG. 4C shows a cross section along lines 4C-4C of FIG. 3C of a deck.

Referring to FIG. 4C, the first end may include a single slot 28A and the second end may include a single slot 28C. In some non-limiting embodiments, the slot in the front end and the back end may be the same (28A/C), such that the single slot 28A/C runs the length of the trailer 10. In other embodiments the single slot in the front end 28A is not in communication and/or is different from the single slot in the second end 28C.

Figure 3A:
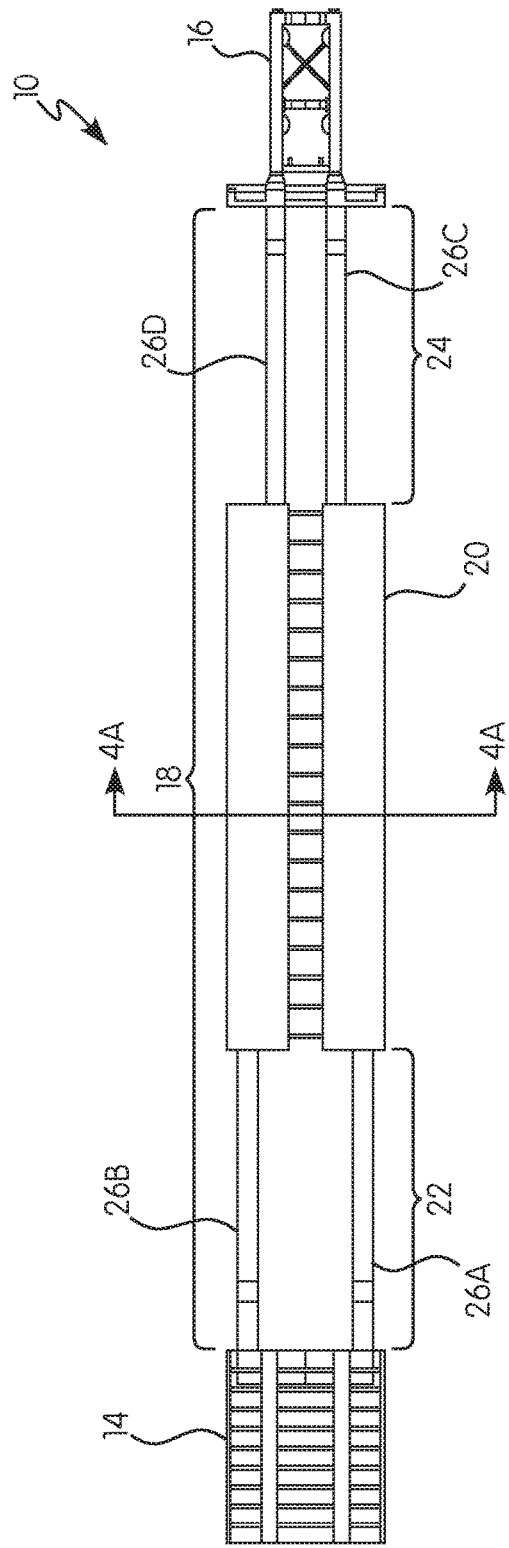
FIG. 3A shows a top view of the trailer of FIG. 2B.

FIGS. 3A and 4A show a configuration of the trailer 10 including the deck 20 having a first end and second end, each of the first end and second end having a plurality of slots 28A-D. As shown in FIG. 4A, four slots 28A-28D may be provided. Inner slots 28C, 28D may be provided inside (laterally) of the outer slots 28A, 28B. These inner slots may slideably engage the beams 26C, 26D of the rear extension 24 so as to allow the rear extension 24 to extend from the deck 20 or be slid back into the deck 20. The outer slots 28A, 28B may slideably engage the beams 26A, 26B of the front extension 22 so as to allow the front extension 22 to extend from the deck 20 or be slid back into the deck 20. Any other number or arrangement of slots 28A-28D may be provided for allowing extension and retraction of the front extension 22 and rear extension 24 from the deck 20.

Figure 3B:
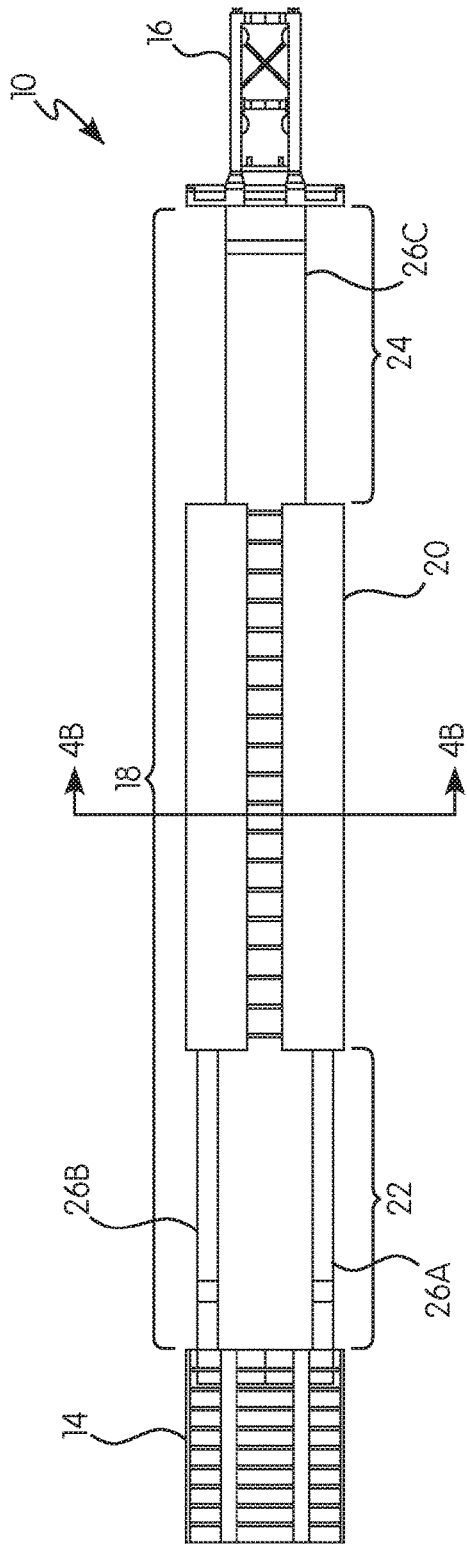
FIG. 3B shows a top view of a trailer in a second position.

FIGS. 3B and 4B show a configuration of the trailer 10 including the deck 20 having a first end and a second end, the first end having a plurality of slots 28A, 28B and the second end having a single slot 28C. As shown in FIG. 4B, three slots 28A-28C may be provided. Inner slot 28C may be provided inside (laterally) of the outer slots 28A, 28B. The outer slots 28A, 28B may slideably engage the beams 26A, 26B of the front extension 22 so as to allow the front extension 22 to extend from the deck 20 or be slid back into the deck 20. Any other number or arrangement of slots 28A-28D may be provided for allowing extension and retraction of the front extension 22 and rear extension 24 from the deck 20. The inner slot 28C may slideably engage the beam 26C of the rear extension 24 so as to allow the rear extension 24 to extend from the deck 20 or be slid back into the deck 20. Although not shown in the drawing figures, a configuration similar to FIGS. 3B and 4B may be provided in which the first end has a single slot, while the second end has a plurality of slots (i.e., the rear extension 24 includes a plurality of beams and the front extension 22 includes only a single beam).

FIGS. 3C and 4C show a configuration of the trailer 10 including the deck 20 having a first end and a second end, the first end having a single slot 28A and the second end having a single slot 28C, such that a single slot 28A/C runs the length of the trailer (the single slot 28A in the first end is the same slot as the single slot 28C in the second end). The slot 28A/C may engage a single beam 26A of the front extension 22 so as to allow the front extension 22 to extend from the deck 20 or be slid back into the deck 20. The slot 28A/C may engage a single beam 26C of the rear extension 24 so as to allow the rear extension 24 to extend from the deck 20 or be slid back into the deck 20. In some embodiments, the front extension 22 may be half the length of the slot 28A/C, and the rear extension 24 may be half the length of the slot 28A/C, such that the front extension 22 and the rear extension 22 do not telescope one another but instead each run half of the length of the slot 28A/C. In other embodiments the front extension 22 may be more than half of the length of the slot 28A/C (such as the entire length) and the rear extension 24 may be more than half of the length of the slot 28A/C (such as the entire length) by the front extension 22 and the rear extension 24 being arranged so as to telescope one another when engaged in the slot 28A/C. This provides additional stretch length to the trailer 10. Arranging the beams in this manner provides for greater strength in the center, and allows for the deck height to be lowered.

Referring back to FIG. 2A, the trailer 10 may include a first position. In the first position, a majority of a length of both the front extension 22 and the rear extension 24 may be contained within the deck 20 such that the first extension 22 and the rear extension 24 are extended from the deck 20 only enough to attach the attachment portion 14 or the rear portion 16, respectively, to the front extension 22 and the rear extension 24. The trailer 10 may be in the first position when the beams 26A-26D of the front extension 22 and rear extension 24 are slid into the corresponding slots 28A-28D in the deck 20 such that the majority of the length of the beams 26A-26D are slid within the corresponding slots 28A-28D such that the first extension 22 and the rear extension 24 are extended from the deck 20 only enough to attach the attachment portion 14 or the rear portion 16, respectively, to the front extension 22 and the rear extension 24. In the first position, the trailer 10 may be at its shortest length.

Referring to FIGS. 2B-3B, the trailer 10 may include a second position. In the second position, at least a portion of both the front extension 22 and the rear extension 24 may extend farther from the deck 20 as compared to the first position. The trailer 10 may be in the second position when the beams 26A-26D of the front extension 22 and rear extension 24 are slid at least partially out of the corresponding slots 28A-28D of the deck 20 beyond the first position. In the second position, the front extension 22 and the rear extension 24 are configured to be pinned at a predetermined length. In other words, different lengths of the beams 26A-26D may extend from the deck 20 and be pinned at a desired length so that the trailer 10 remains at that length during transportation.

In the second position, the deck 20 of the trailer 10 may be located in any position relative to the trailer 10. The deck 20 may be positioned toward the front third of the trailer 10 (e.g., the front extension 22 does not extend as far as the rear extension 24 such that the deck 20 is located closer to the front of the trailer 10). The deck 20 may be positioned toward the rear third of the trailer 10 (e.g., the rear extension 24 does not extend as far as the front extension 22 such that the deck 20 is located closer to the rear of the trailer 10). The deck 20 may be positioned in the middle third of the trailer 10 or in the middle of the trailer 10 (e.g., the front extension 22 or the rear extension 24 are similar or identical in length such that the deck 20 is locate proximate the center of the length of the trailer 10). The deck 20 may be positioned, relative to the trailer 10 such that the heaviest portion of the load being transported is supported by the deck 20. The deck 20 may be the strongest portion of the trailer 10. The deck 20 may be located exactly in the center of the length of the trailer 10 to provide maximum strength for carrying the load being transported.

In the second position, only one of the front extension 22 or the rear extension 24 may be extended beyond the corresponding first position (i.e., the trailer 10 is only extended in a single direction). For example, the deck 20 of the trailer 10 may be positioned toward the back of the trailer 10 with the front extension 22 extending farther from the deck 20 compared to the first position and the rear extension 24 extending only enough to attach the rear portion 16 (as in the first position). For example, the deck 20 of the trailer 10 may be positioned toward the front of the trailer 10 with the rear extension 24 extending farther from the deck 20 compared to the first position and the front extension 22 extending only enough to attach the attachment portion 14 (as in the first position).

With continued reference to FIGS. 2A-3B, the trailer 10 may be lockable such that, in a locked position, the front extension 22 and/or the rear extension 24 may not be slideable relative to the deck 20. This locked position allows the trailer 10 to maintain the desired length during transportation. The trailer 10 may also include an unlocked position such that the front extension 22 and/or the rear extension 24 may be slideable relative to the deck 20. This unlocked position allows for adjustment of the length of the trailer 10. The front extension 22 and rear extension 24 may be locked relative to the trailer 10 using any suitable locking configuration. For example, the front extension 22 and rear extension 24 can include a plurality of pin holes. The deck 20 may also include one or more pin holes. The front extension 22 and rear extension 24 may be locked, e.g., pinned, at a desired length by inserting a locking pin through aligned pin holes in the front extension 22 (and/or rear extension 24) and the deck 20. Separate locks may be provided for the front extension 22 and rear extension 24.

As previously discussed, the front extension 22 and rear extension 24 may be slideably engaged with the deck 20 (such as the beams 26A-26D of the front extension 22 and rear extension 24 being slideably engaged with the corresponding slots 28A-28D of the deck 20). The front extension 22 may be slideable relative to the deck 20 independent of the rear extension 24. Similarly, the rear extension 24 may be slideable relative to the deck 20 independent of the front extension 22. In other words, the front extension 22 may be slid without causing the rear extension 24 to slide, and vice versa.

The front extension 22 and/or the rear extension 24 may be slid relative to the deck 20 using any suitable method. For instance, the front extension 22 and/or the rear extension 24 may be slid to extend away from the deck 20 or into the deck 20 manually. The front extension 22 and/or the rear extension 24 may be slid using the cab 12. For example, the trailer 10 may be attached to the cab 12. To slide the front extension 22 away from the deck 20, the lock co-acting with the front extension 22 may be moved from the locked position to the unlocked position. The cab 12 may then drive forward to extend the front extension 22 away from the deck 20. The cab 12 may be driven in reverse to slide the front extension 22 back into the deck 20. To slide the rear extension 24 away from the deck 20, the lock co-acting with the rear extension 24 may be moved from the locked position to the unlocked position. The cab 12 may then drive forward to extend the rear extension 24 away from the deck 20. The cab 12 may be driven in reverse to slide the rear extension 24 back into the deck 20. The front extension 22 and rear extension 24 may be slid in the above-described manner (using the cab 12) simultaneously by placing in the unlocked position the lock(s) co-acting with the front extension 22 and the rear extension 24.

The trailer 10, in particular the bed portion 18 of the trailer 10, may be made of any material of suitable strength, such as metal. At least a portion of the bed portion 18 may be made of steel. At least a portion of the deck 20 may be made of steel. At least a portion of the front extension 22 and/or the rear extension 24 may be made of steel, such as a portion of the beams 26A-26D.

Figure 5:
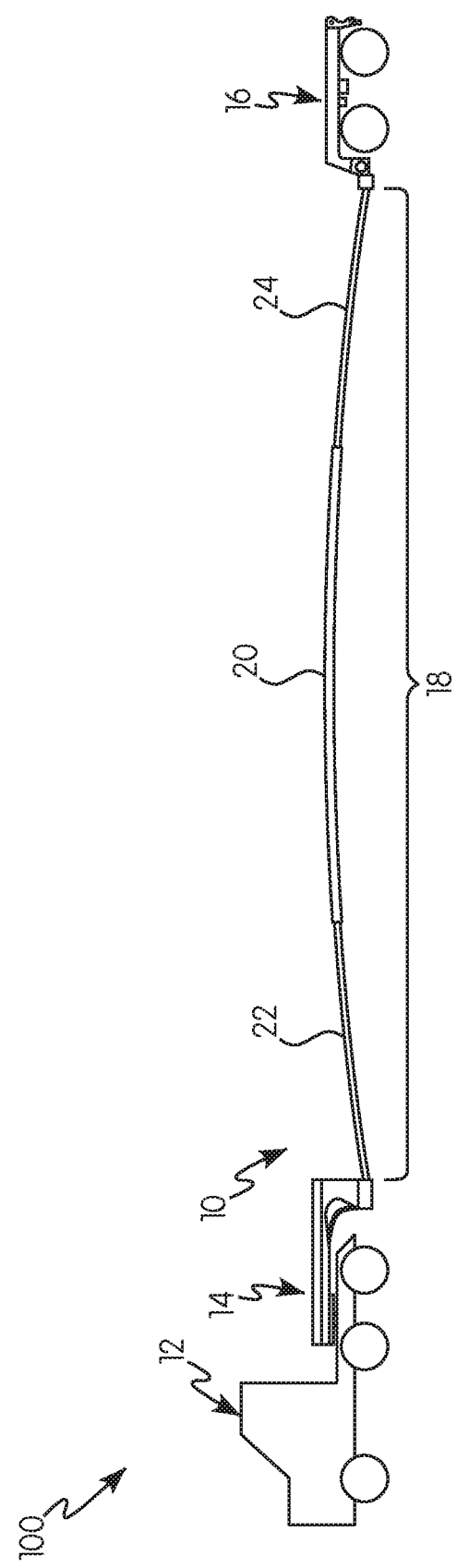
FIG. 5 shows a side view of a towing system having a trailer including an arc-shaped section attached to a cab.

Referring back to FIG. 1, the bed portion 18 of the trailer 10 may include a horizontal section, such that the horizontal section is parallel to a road on which the trailer 10 is traveling (the horizontal section is flat). Referring to FIG. 5, the bed portion 18 of the trailer 10 may include an arc-shaped section such that a section between the ends of the bed portion 18 is higher (vertically) than the ends of the bed portion 18 when not supporting a load. The highest point of the arc-shaped section of the bed portion 18 may be located proximate to the center of the bed portion 18. Proximate to the center in this context means in the middle third of the bed portion 18.

Figure 6A:
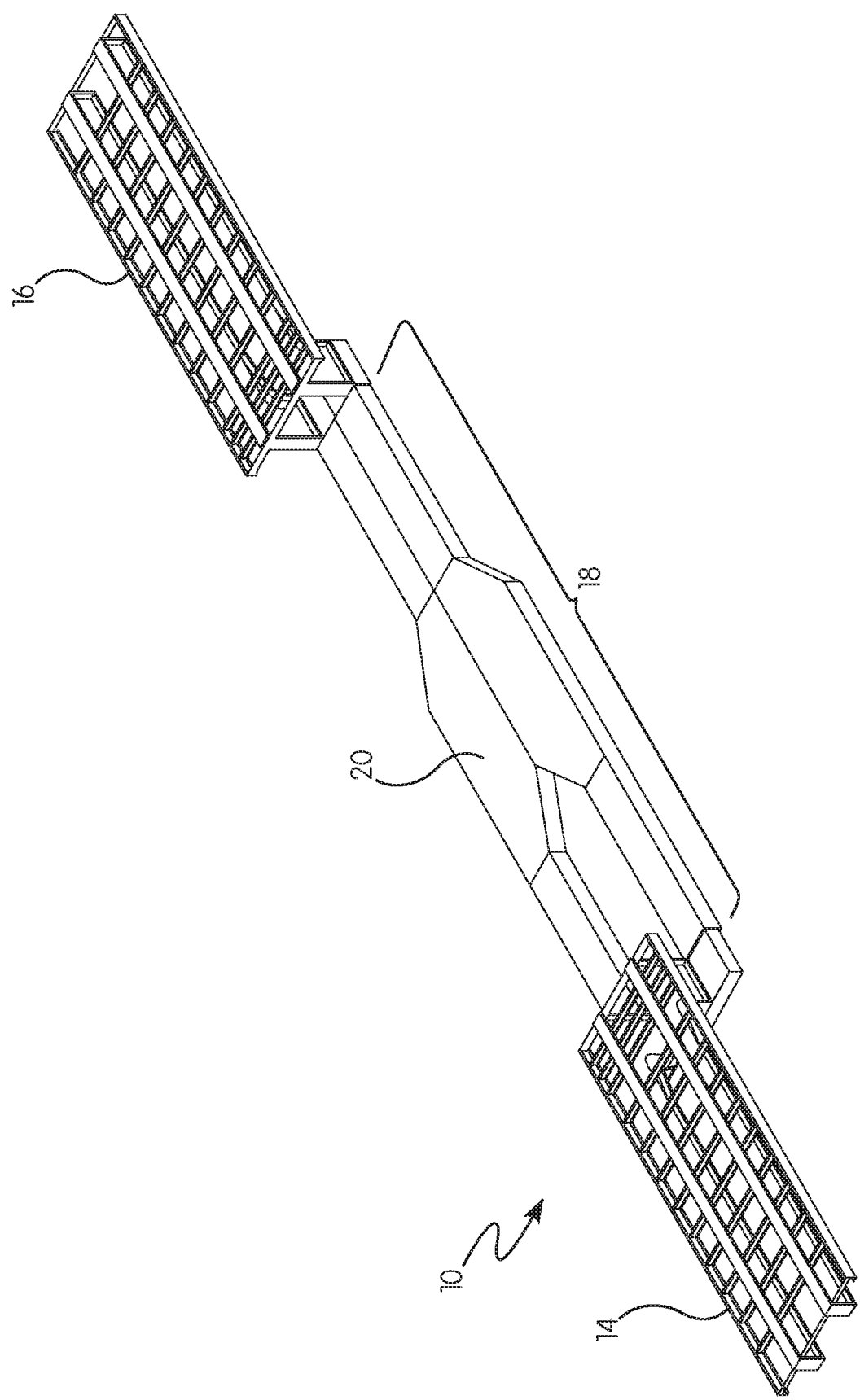
FIG. 6A shows a perspective view of another embodiment of a trailer in a first position.
Figure 6B:
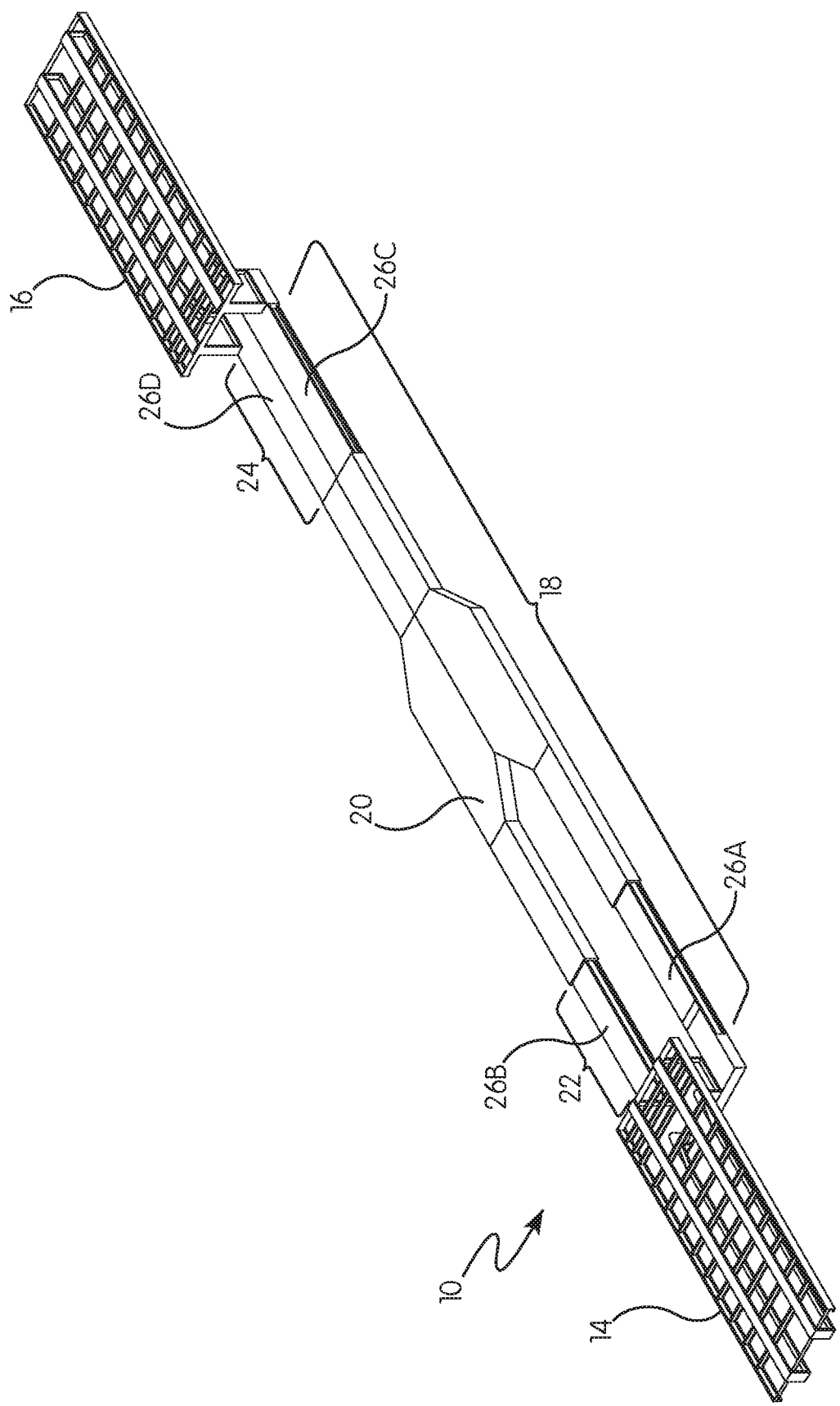
FIG. 6B shows a perspective view of another embodiment of a trailer in a second position.

Referring to FIGS. 6A and 6B, another non-limiting embodiment of the trailer 10 is shown. The embodiment of the trailer 10 shown in FIGS. 6A and 6B includes all of the features of the trailers 10 shown in FIGS. 2A, 2B, 3A, and 3B having like reference numbers. The trailer 10 in FIGS. 6A and 6B differs from the trailer 10 shown in FIGS. 2A, 2B, 3A, and 3B in the shape of the deck 20. In FIGS. 6A and 6B, the deck 20 is shaped differently so as to require less material. This allows for even further weight savings for the trailer 10. In some non-limiting embodiments, ends of the deck 20 may have comparatively less material, so that only enough material is provided to receive the front extension 22 and rear extension 20 in the first position (see FIG. 6A). For example, as shown in FIG. 6B, a front end of the bed portion 18 may include a pair of beams 28A, 28B having a gap therebetween. To save material and weight for the trailer 10, the deck 20 in this non-limiting embodiment, may have an end configured to receive the pair of beams 28A, 28B, such that the deck 20 also has a gap on this end corresponding to the gap in the beams 28A, 28B. Further the rear end of the bed portion 18 may include a pair of beams 28C, 28D with no gap therebetween. To save material and weight for the trailer 10, the deck 20 in this non-limiting embodiment, may have an end configured to receive the pair of beams 28C, 28D, such that the deck 20 also has no gap but has less material to either side of the portion of the deck 20 receiving the touching beams 28C, 28D. It will be appreciated that the deck 20 can be of any shape suitable for receiving the front extension 22 and rear extension 24.

Referring to FIGS. 7A-8B, a non-limiting embodiment of the trailer 10 having a steering mechanism for steering the trailer 10 in an automatic steering mode is shown. The trailer 10 may include a plurality of axles 30, each axle 30 attached to wheels 32. The wheels 32 may roll along the ground upon rotation of the axles 30 so that the trailer 10 can move. The axles 30 may each be attached to a turntable 34, which is attached to the trailer 10. For instance, the turntables 34 may be attached to the rear portion 16 and/or the attachment portion 14 of the trailer 10. The turntables 34 may be rotatably attached to the trailer 10, such that rotation of the turntables 34 turns the axles 30 (and therefore the wheels 32) relative to the trailer 10. Each turntable 34 may be attached to an adjacent turntable 34 via an attaching member 36. In some non-limiting embodiments, the attaching member 36 may be a cylinder or a rod; however, the attaching member 36 may be any other suitable member. The adjacent turntables 34 may be attached by the attaching member 36 so that rotation of one of the turntables 34 may effect rotation of the adjacent turntables 34. While turntable axles are described herein, it will be appreciated that kingpin axles could also be used for steering the trailer 10.

With continued reference to FIGS. 7A-8B, the wheels 32 (such as the wheels 32 of the rear portion 16 as in FIGS. 7A-7G) may be steered using a bellcrank 38 arrangement. The bellcrank 38 may be positioned in the attachment portion 14 of the trailer 10. The bellcrank 38 may co-act with the plurality of axles 30 to turn the plurality of axles 30 (and therefore the wheels 32) relative to the deck 20. The bellcrank 38 may include a ring bearing 39 rotatable relative to the attachment portion 14. The ring bearing 39 may be circular. The ring bearing may include a pin 40 to attach the trailer 10 to the cab 12 (not shown) such that the cab 12 may tow the trailer 10. The bellcrank 38 may also include at least one front cylinder 42. To steer the trailer 10, rotation of the ring bearing 39 may cause movement of the at least one cylinder 42, the motion transferred through the bellcrank 38. Movement of the at least one cylinder 42 may co-act with the turntables 34 to effect turning of the axles 30. The at least one front cylinder 42 may co-act with at least one rear cylinder (not shown) proximate the wheels 32 of the rear portion 16. The at least one front cylinder 42 may be attached to the at least one rear cylinder by hydraulic lines (not shown). The at least one front cylinder 42 may cause the movement (through the hydraulic lines) of the at least one rear cylinder by the same amount. For example, movement of the front cylinder 42 by one inch many cause movement of the rear cylinder by one inch. Therefore, according to the steering arrangement, the cab 12 may turn to exert a force on the pin 40 attached thereto. The pin 40 may cause rotation of the ring bearing 39, the motion of which is transferred to the at least one cylinder 42 through the bellcrank 38. The movement of the at least one cylinder 42 causes movement of the at least one rear cylinder to effect rotation of the turntables 34 to turn the axles 30. The axles 30 may not turn by the same amount (degrees relative to the attachment portion 14) as the amount the ring bearing 39 is rotated. The axles 30 may be restricted so that they may only turn a certain number of degrees.

Figure 7C:
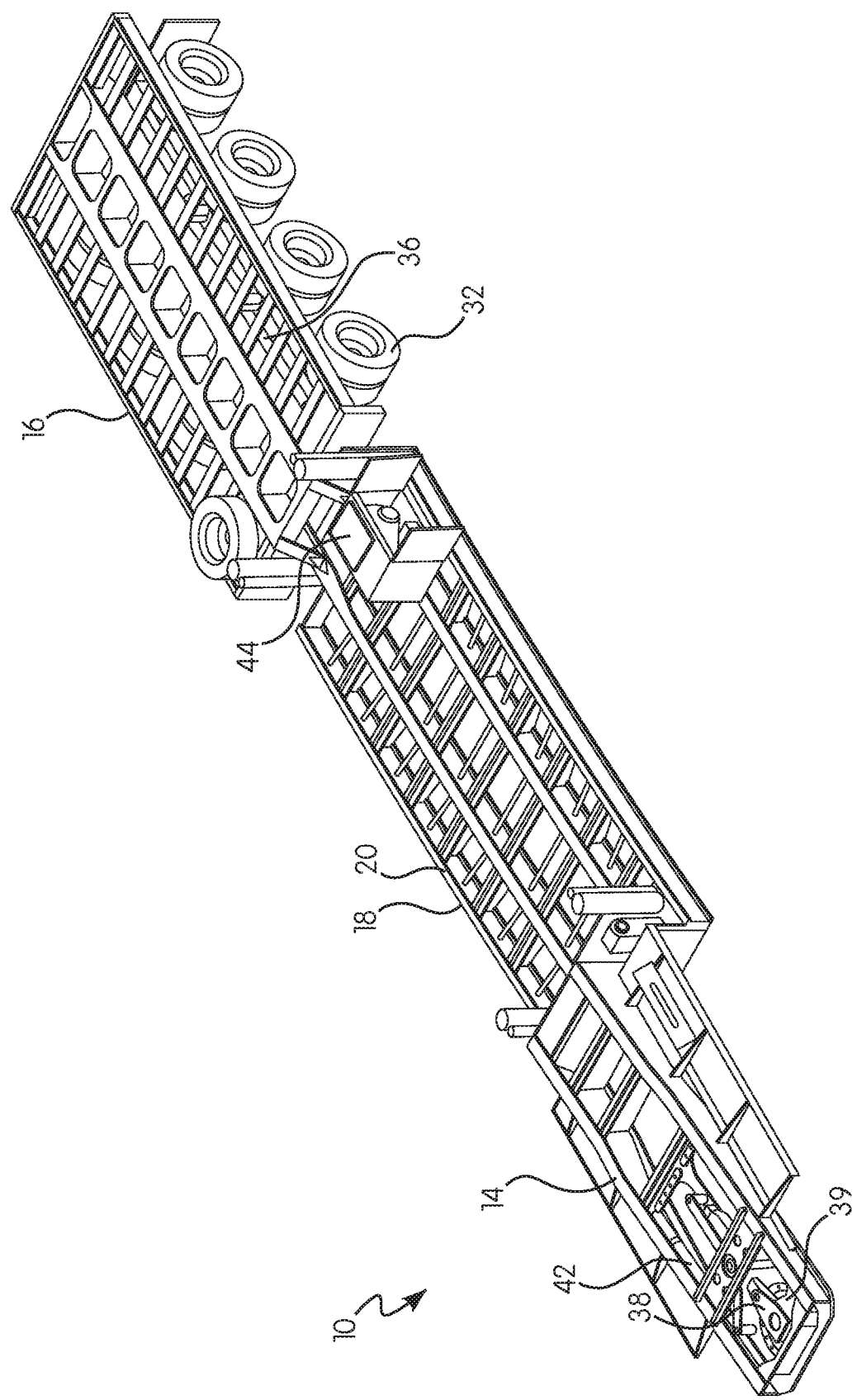
FIG. 7C shows a perspective of the trailer of FIG. 7A.
Figure 7D:
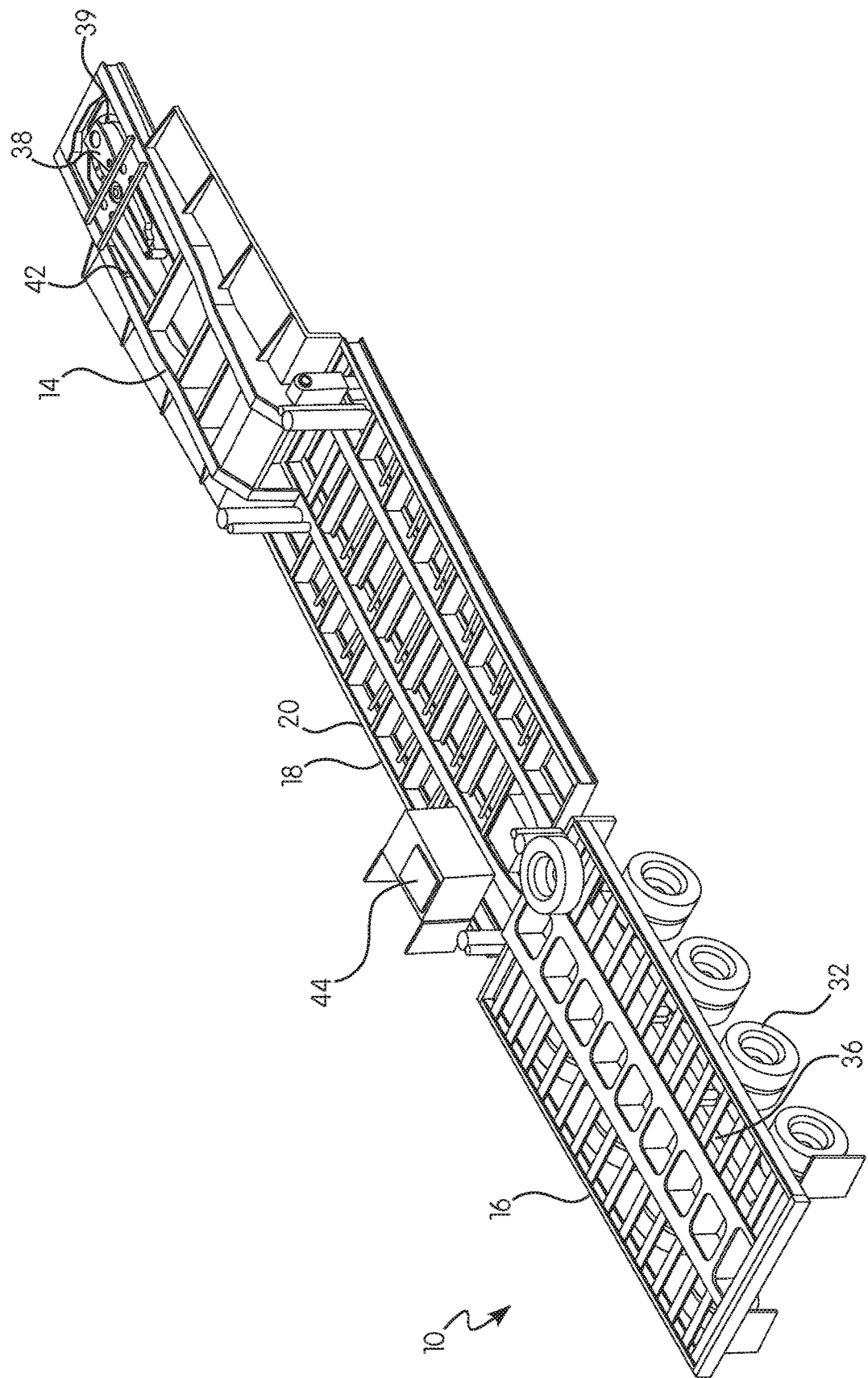
FIG. 7D shows another perspective of the trailer of FIG. 7A.
Figure 7E:
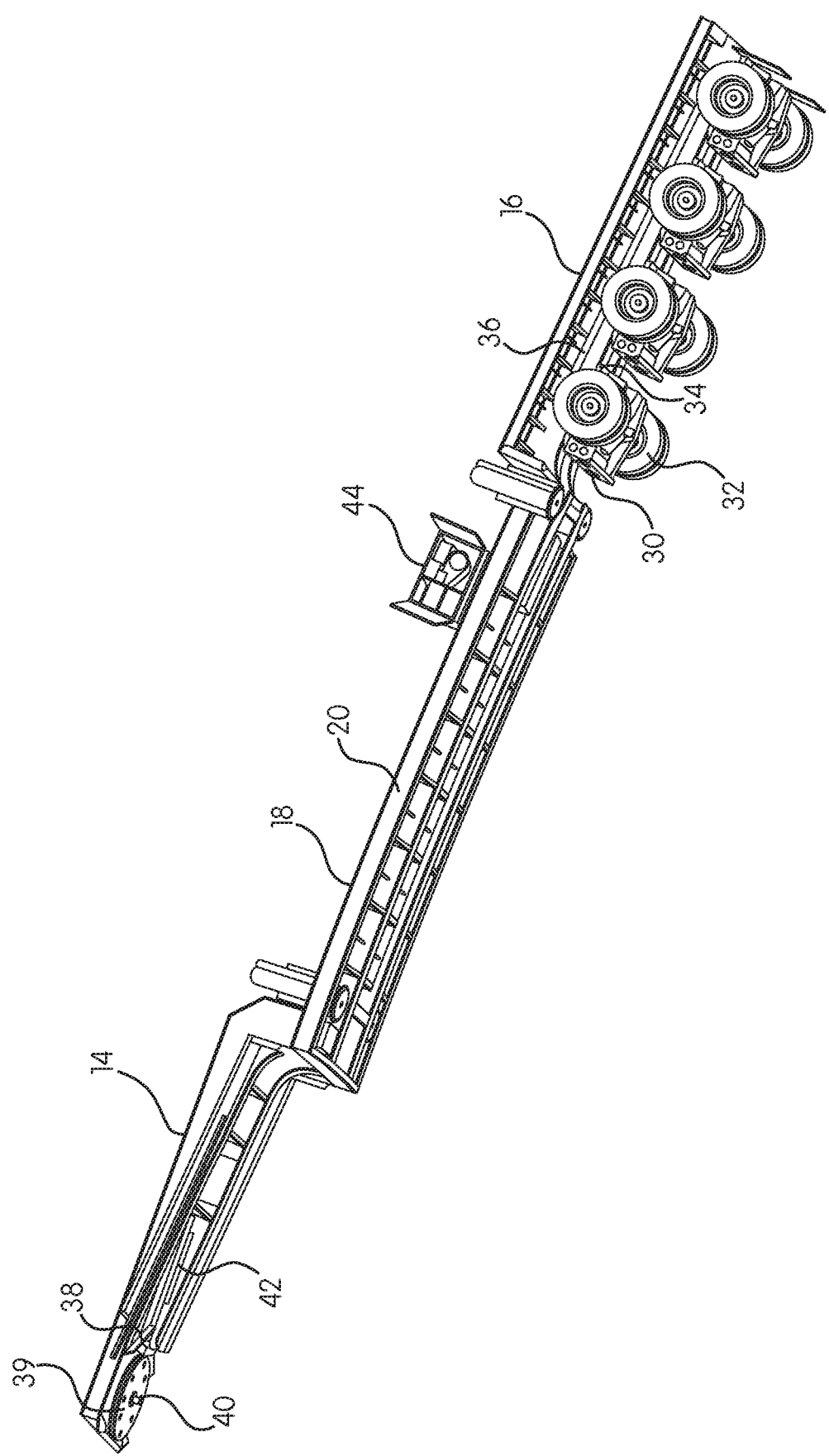
FIG. 7E shows another perspective of the trailer of FIG. 7A.
Figure 7F:
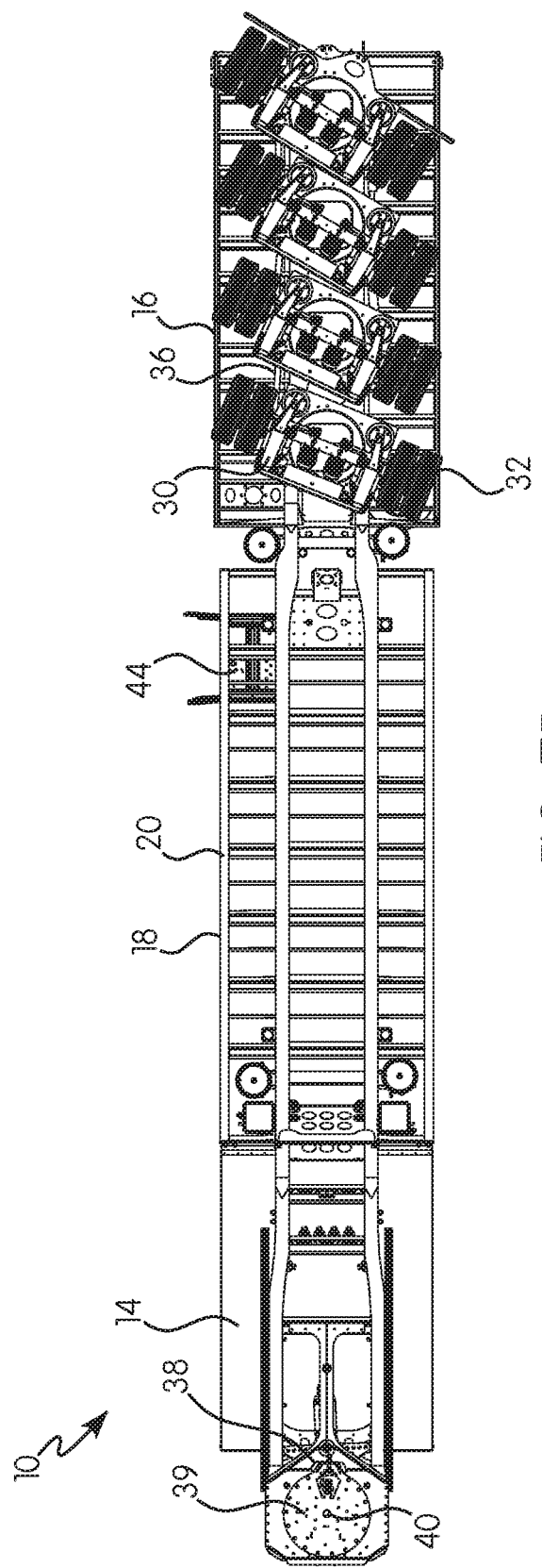
FIG. 7F shows a bottom view of the trailer of FIG. 7A with the axles turned.
Figure 7G:
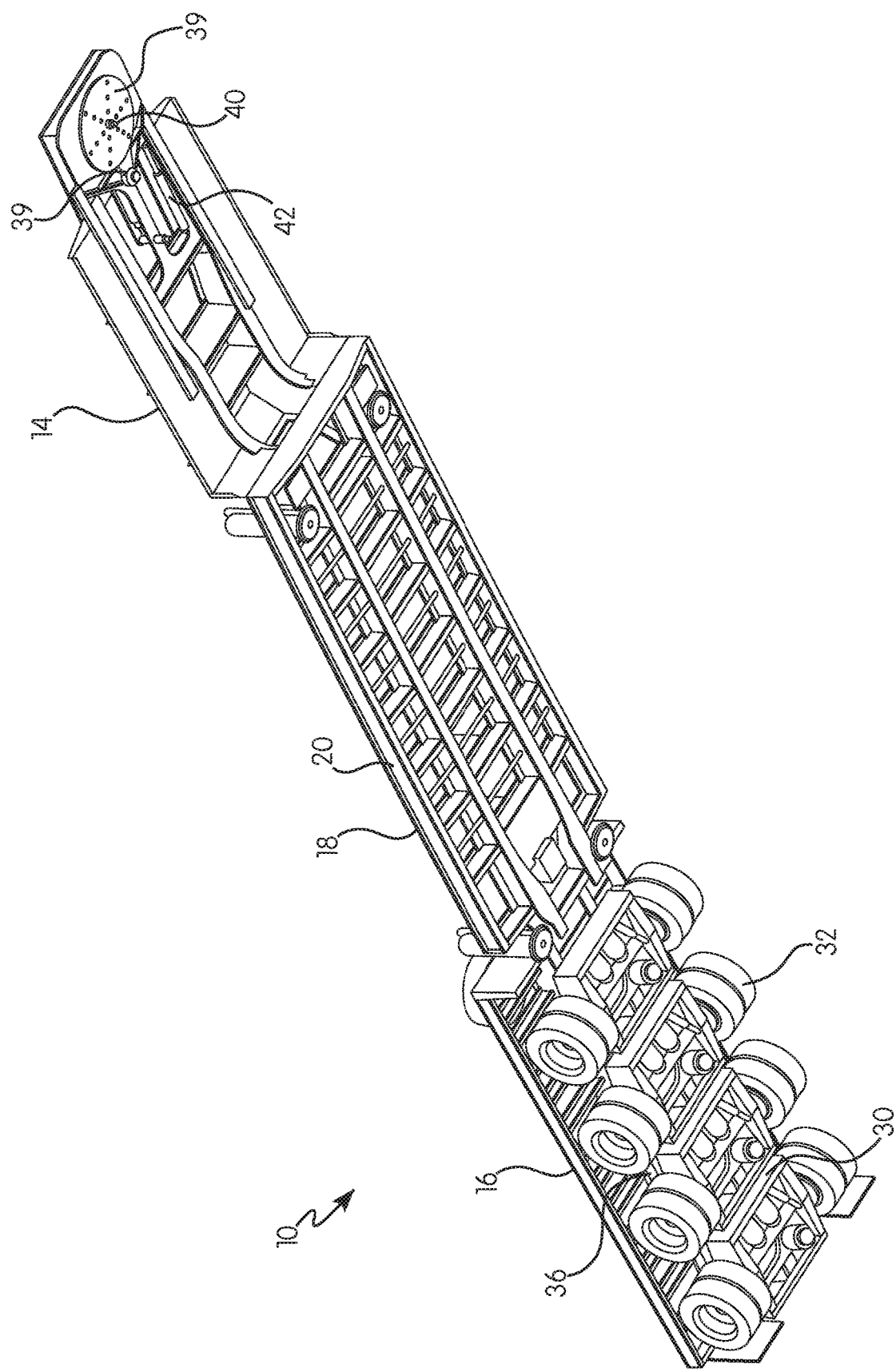
FIG. 7G shows another perspective of the trailer of FIG. 7A.
Figure 7H:
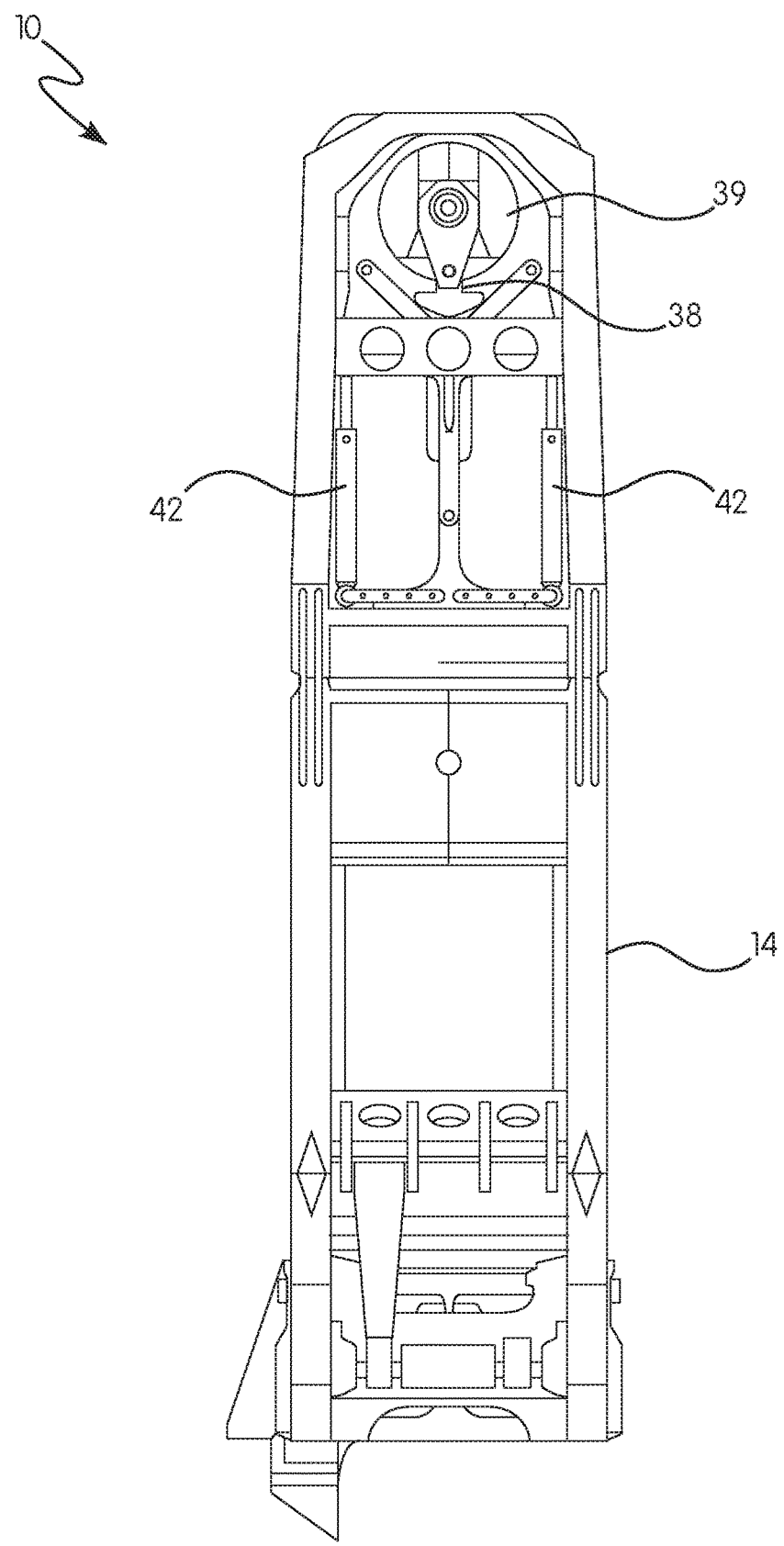
FIG. 7H shows a top view of an attachment portion of a trailer with a ring bearing not rotated.
Figure 71:
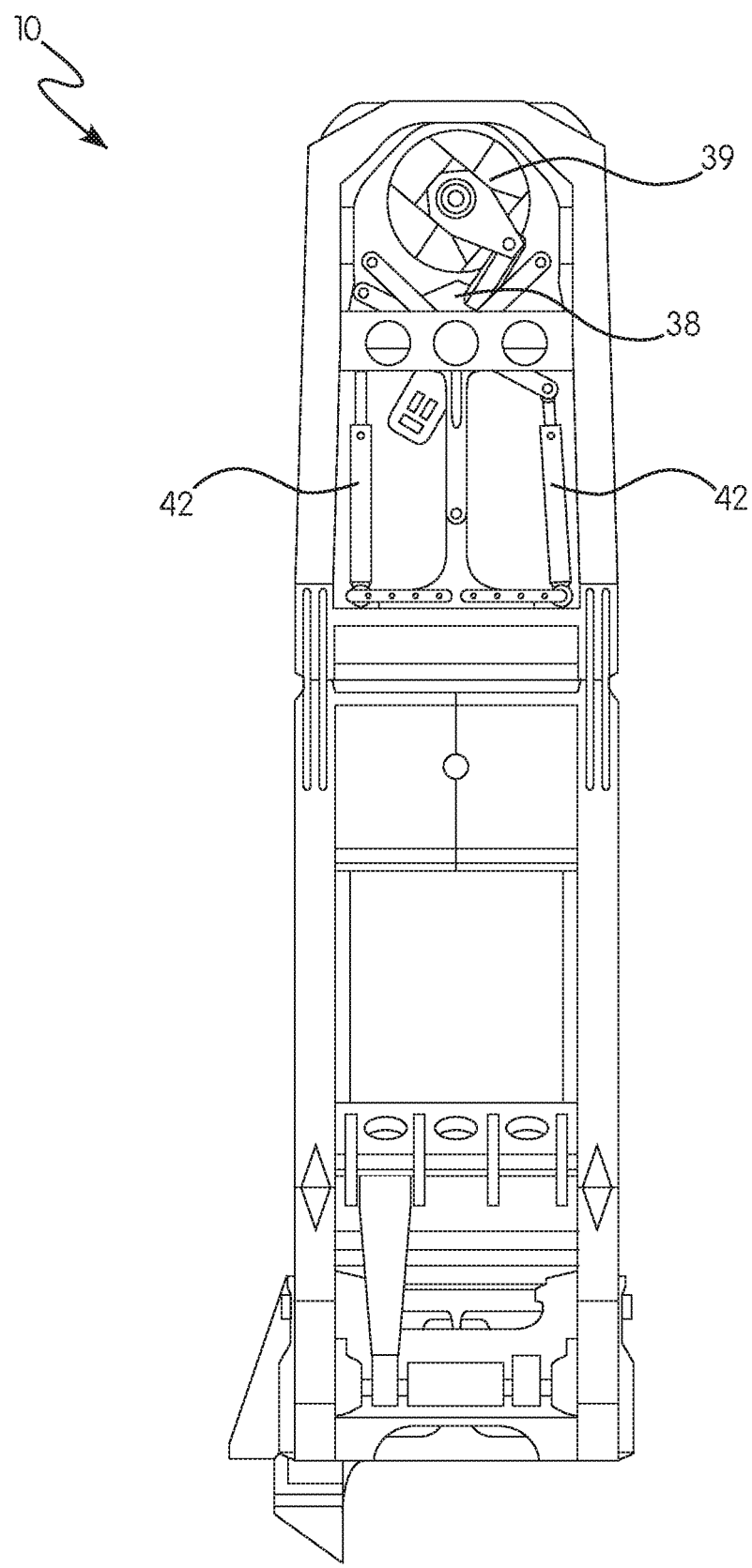
Figure 8A:
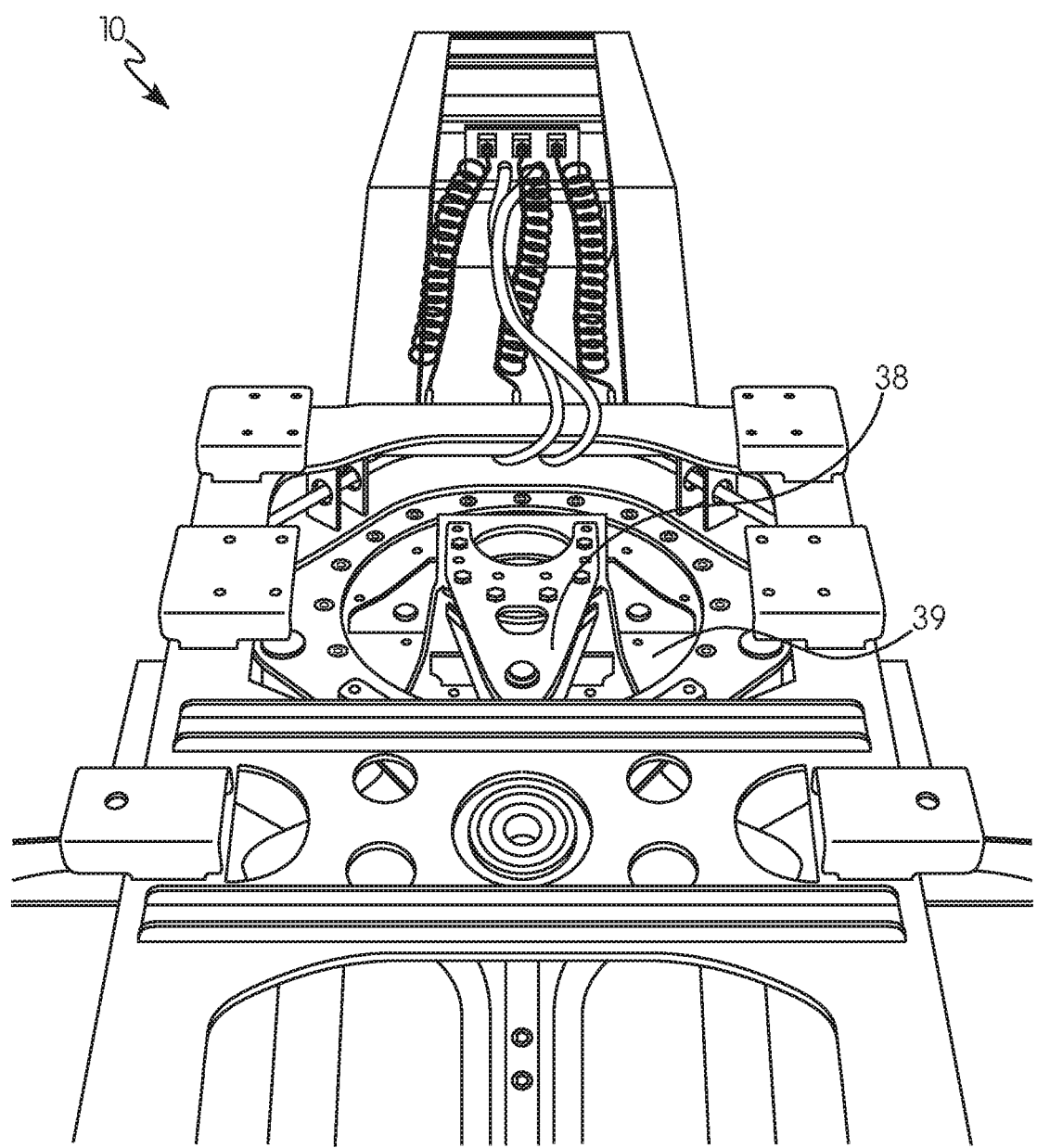
FIG. 8A shows a perspective view of a bellcrank of a trailer.
Figure 8B:
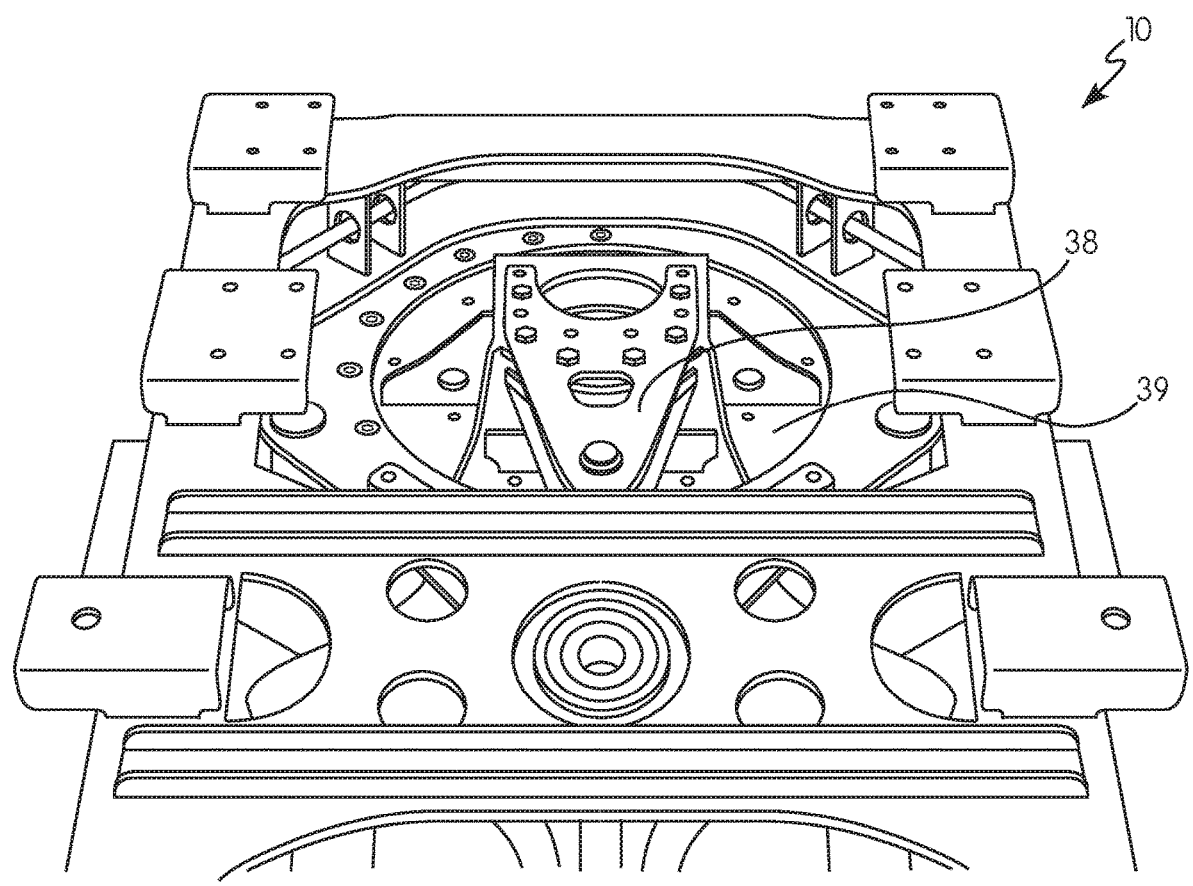
FIG. 8B shows another perspective view of the bellcrank of FIG. 8A.

Referring to FIGS. 7H and 7I, in some non-limiting embodiments, the attachment portion 14 may include two front cylinders 42. In FIG. 7H the ring bearing 39 is not rotated relative to the attachment portion 14. Meanwhile, in FIG. 7I, the ring bearing 39 is rotated relative to the attachment portion 14, which (through the bellcrank 38) causes movement of the two front cylinders 42. In this example, the ring bearing 39 rotates counterclockwise (from a left turn of an attached cab 12), pushing the right front cylinder 42 and pulling the left front cylinder 42. Not shown in this FIG. 7I is the movement of the front cylinders 42 causing movement of corresponding cylinders in the rear portion 16 of the trailer 10, which effects turning of the axles 30.

With continued reference to FIGS. 7A-8B, the bellcrank 38 arrangement may be used in the automatic steering mode, as described above, to steer the wheels 32 based on the direction of the cab 12 to which the trailer 10 is attached is moving. A turn by the cab 12 in this automatic steering mode may exert a force on the pin 40 of the bellcrank 38. The bellcrank 38 may co-act with the pin 40 and, in turn, exert a force on the front cylinder 42. The front cylinder 42 may then co-act with the turntables 34 to rotate the turntables 34, which turns the axles 32. Thus, turning of the cab 12 effects turning of the wheels 32. FIG. 7F shows a non-limiting embodiment of the axles 30 turned. Each of the axles 30 may be turned at the same or different angle relative to the deck 20.

With continued reference to FIGS. 7A-8B, the trailer 10 may be steered in the automatic steering mode without including a bellcrank 38 arrangement. Instead, the bellcrank 38 may be replaced with an electronic encoder sensor which communicates with a power unit 44 and activates an automatic rear steering mechanism.

With continued reference to FIGS. 7A-8B, the trailer 10 may be configured to be steered in a manual mode. The trailer 10 may include at least one power unit 44. The power unit 44 may be configured to allow a driver of the cab 12 towing the trailer 10 to manually turn the axles 30. The axles 30 may turn while the trailer 10 is stationary. The power unit 44 may allow for each axle 30 to be turned manually (relative to the deck 20) and may allow for a single axle 30 or any combination of axles 30 to be turned manually. This may allow for more precise control over the turning of the trailer 10, which may be useful for particularly tight or otherwise difficult turns. In some non-limiting embodiments, the power unit 44 may turn the axle(s) 30 manually when the trailer 10 is stationary (before beginning movement). This may allow the trailer 10 to begin a turn immediately when starting movement from a stationary position.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent ranges that are within the spirit and scope of the appended claims. For example, it is to be understood that the present invention contemplates, to the extent possible, one or more features of any embodiment can be combined with one or more features of any other embodiment.

The invention claimed is:

1. A trailer comprising:
   an attachment portion configured to attach the trailer to a cab; and
   a bed portion connected to the attachment portion, the bed portion comprising:
      a deck comprising a first end comprising at least one slot and a second end comprising at least one slot, wherein the at least one slot of the first end is laterally positioned relative to the at least one slot of the second end;
      a front extension slideably engaged with the at least one slot of the first end of the deck and configured to move lengthwise relative to and from the deck; and
      a rear extension separate from the front extension, wherein the rear extension is slideably engaged with the at least one slot of the second end of the deck and is configured to move lengthwise relative to and from the deck,
   wherein the deck is positioned at a lower height compared to a height of the attachment portion.

2. The trailer of claim 1, wherein the first end or the second end comprises a plurality of slots.

3. The trailer of claim 2, wherein the front extension comprises a plurality of beams slideably engaged with the plurality of slots in the first end of the deck.

4. The trailer of claim 2, wherein the rear extension comprises a plurality of beams slideably engaged with the plurality of slots in the second end of the deck.

5. The trailer of claim 2, wherein the first end comprises a plurality of slots and the second end comprises a single slot or the second end comprises a plurality of slots and the first end comprises a single slot.

6. The trailer of claim 1, wherein, in a first position, the front extension and the rear extension are extended from the deck only enough to attach the attachment portion and a rear portion, respectively, to the front extension and the rear extension.

7. The trailer of claim 6, wherein, in a second position, the front extension or the rear extension extends farther from the deck as compared to the first position.

8. The trailer of claim 7, wherein, in the second position, the front extension or the rear extension are configured to be pinned at a predetermined length.

9. The trailer of claim 1, wherein the trailer is lockable such that, in a locked position, the front extension or rear extension is not slideable relative to the deck.

10. The trailer of claim 1, wherein the front extension is slideable relative to the deck independent from the rear extension, and the rear extension is slideable relative to the deck independent from the front extension.

11. The trailer of claim 1, wherein at least a portion of the bed portion is made of steel.

12. The trailer of claim 1, wherein the bed portion comprises an arc-shaped section.

13. The trailer of claim 1, wherein the bed portion comprises a horizontal section.

14. The trailer of claim 1, wherein the trailer comprises a plurality of axles, wherein a turntable is mounted on each of the plurality of axles, wherein rotation of one of the turntables is configured to turn a respective axle of the plurality of axles relative to the deck.

15. The trailer of claim 14, wherein the attachment portion comprise a bellcrank co-acting with the turntables to turn the plurality of axles relative to the deck.

16. The trailer of claim 15, wherein the bellcrank is attached to a ring bearing and at least one cylinder, wherein rotation of the ring bearing effects movement of the at least one cylinder, which is configured to co-act with the turntables to effect turning of the plurality of axles.

17. The trailer of claim 14, wherein each of the turntables is attached to an adjacent turntable by an attaching member, such that rotation of one of the turntables effects rotation of the adjacent turntable.

18. The trailer of claim 1, wherein the trailer comprises a plurality of axles, wherein the trailer further comprises at least one power unit configured to manually turn the plurality of axles.

19. The trailer of claim 1, wherein the trailer comprises a plurality of wheels, wherein a turntable axle connected to the plurality of wheels is positioned between the plurality of wheels.

20. A towing system comprising:
a cab; and
a trailer comprising:
    an attachment portion configured to attach the trailer to the cab; and
    a bed portion connected to the attachment portion, the bed portion comprising:
        a deck comprising a first end comprising at least one slot and a second end comprising at least one slot, wherein the at least one slot of the first end is laterally positioned relative to the at least one slot of the second end;
        a front extension slideably engaged with the at least one slot of the first end of the deck and configured to move lengthwise relative to and from the deck; and
        a rear extension separate from the front extension, wherein the rear extension is slideably engaged with the at least one slot of the second end of the deck and is configured to move lengthwise relative to and from the deck,
wherein the deck is positioned at a lower height compared to a height of the attachment portion.

* * * * *